United States Patent [19]
Steinke

[11] Patent Number: 5,113,908
[45] Date of Patent: May 19, 1992

[54] MULTISTEP TRIM DESIGN

[75] Inventor: Joseph H. Steinke, Huntington Beach, Calif.

[73] Assignee: Dresser Industries, Inc., Dallas, Tex.

[21] Appl. No.: 557,129

[22] Filed: Sep. 4, 1990

[51] Int. Cl.⁵ .............................................. F16K 47/04
[52] U.S. Cl. ............................. 137/625.3; 137/625.33; 29/890.122; 251/127
[58] Field of Search ............. 137/625.3, 625.33; 251/127; 29/890.122

[56] References Cited

FOREIGN PATENT DOCUMENTS

| | | | |
|---|---|---|---|
| 599028 | 5/1960 | Canada | 251/127 |
| 2582072 | 11/1986 | France | 251/127 |

Primary Examiner—Arnold Rosenthal
Attorney, Agent, or Firm—Baker & Botts

[57] ABSTRACT

A trim design (40) comprises a housing (42) having a generally cylindrical passage (44) passing therethrough. Disposed between an inlet (50) and an outlet (48) is a stepped plug (52) having an axial length. Telescopically receiving the stepped plug (52) is a stepped first cage (56). A second cage (82) having apertures (84) therethrough is positioned between the outlet (48) and the first cage (56). The first cage (56) has axial channels (80) for the passage of fluid through the trim design (40). As the plug (52) is moved from a closed position to an opened position, fluid enters a tortuous path formed by the stepped plug (52), the first cage (56) and the axial channels (80) to produce a desired flow capacity change. Flow path decreases in tortuosity with increasing plug travel thereby increasing the flow capacity.

29 Claims, 4 Drawing Sheets

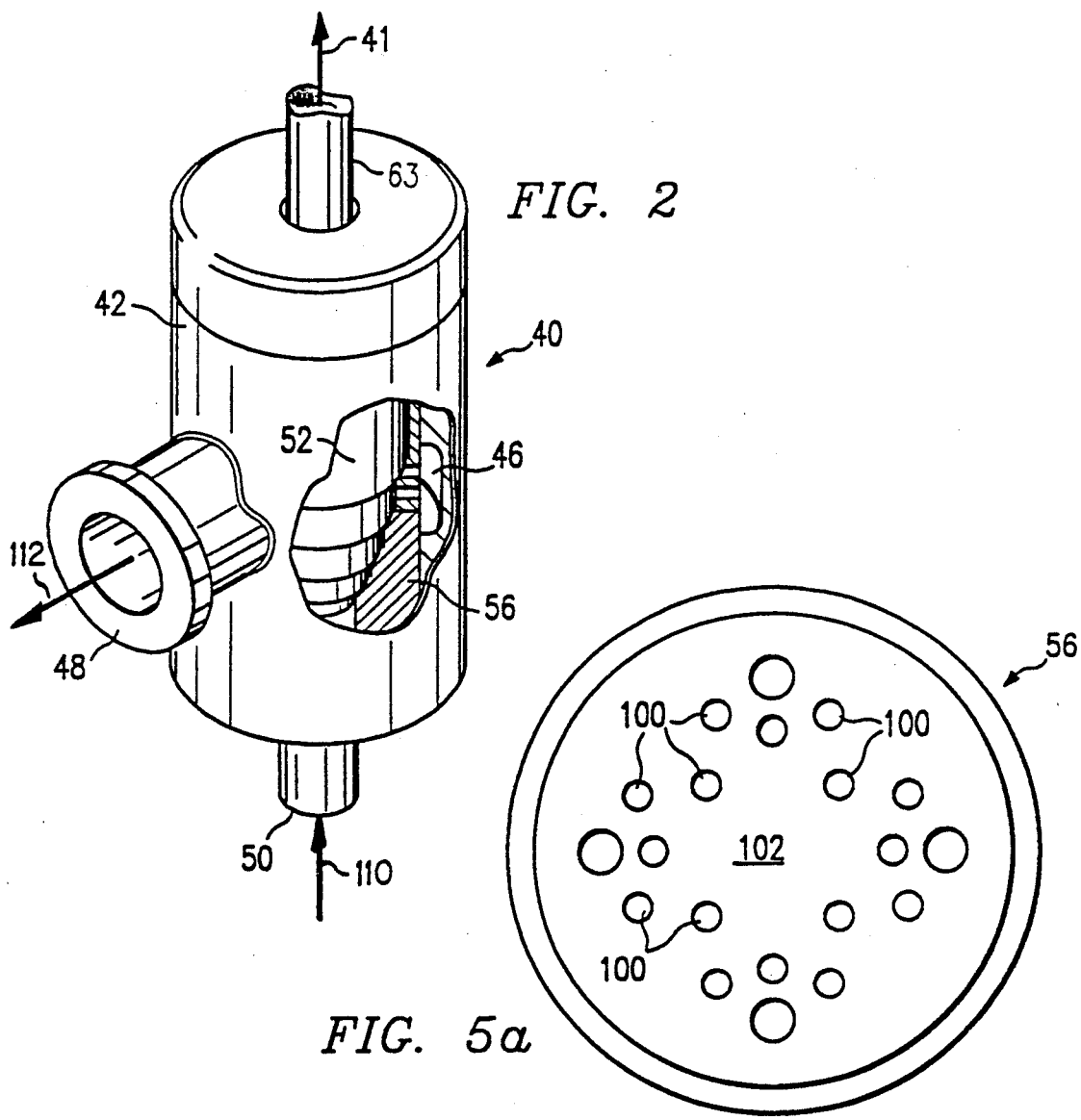
FIG. 2
FIG. 5a
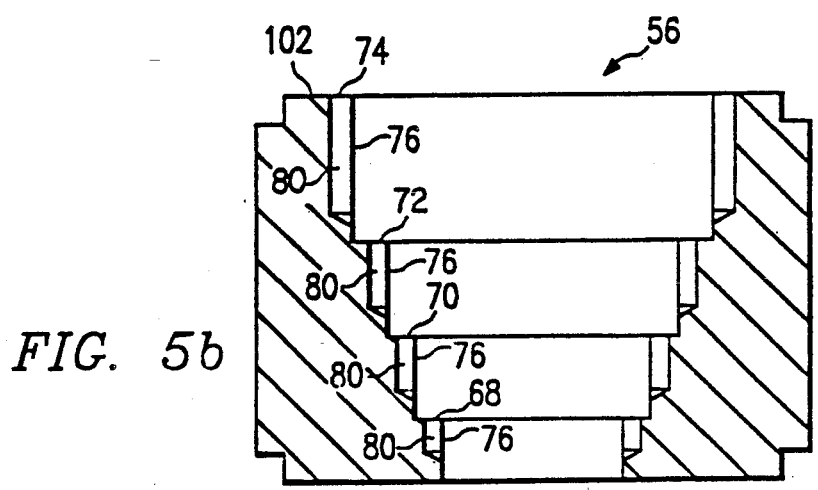
FIG. 5b

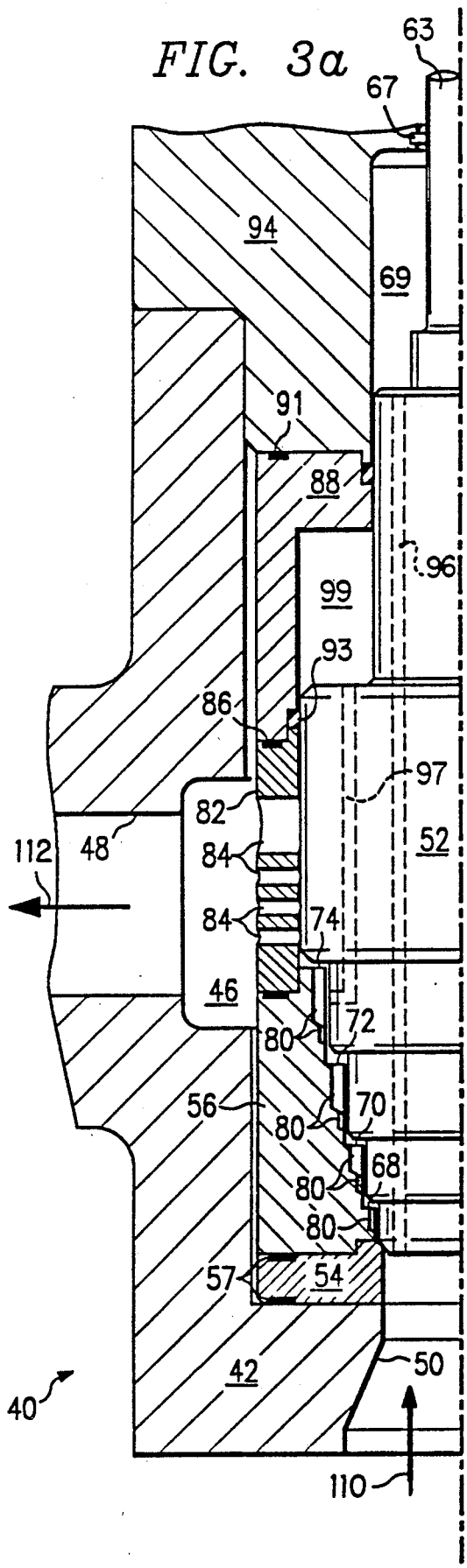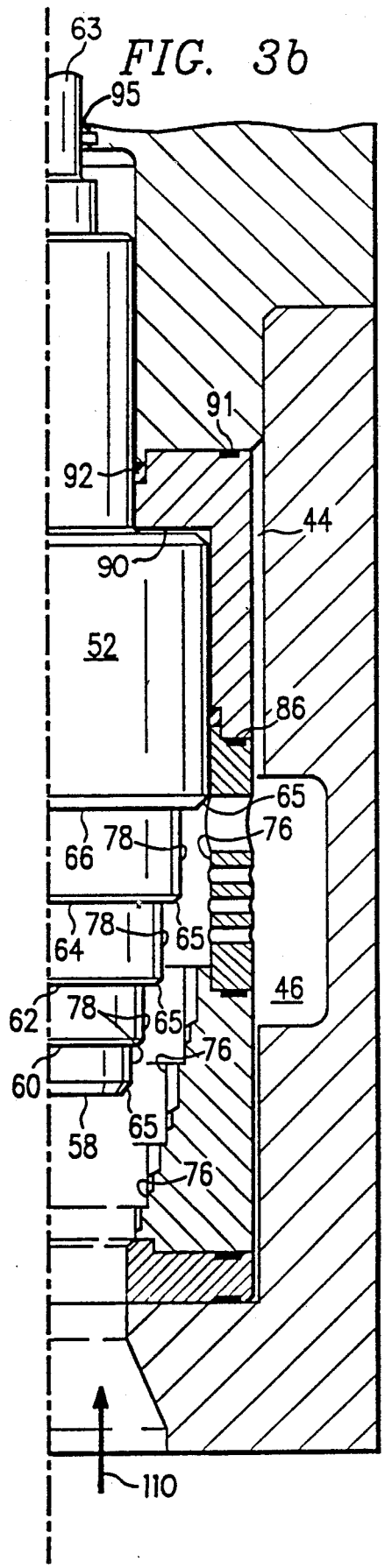

MULTISTEP TRIM DESIGN

TECHNICAL FIELD OF THE INVENTION

This invention relates in general to control valves, and in particular to a multistep trim design for regulating flow capacity of fluids.

BACKGROUND OF THE INVENTION

Flow restriction valves that convert fluid energy by pressure reduction are well known in the art. Such valves may comprise a simple design having a single stage for pressure reduction or a more complex design having multiple stages for gradual pressure reduction. Due to the noise level and the resulting wear of parts found in single stage reduction designs, multiple stage designs have become more common.

Multiple stage designs such as disclosed in U.S. Pat. No. 3,485,474, Apr. 8, 1968 to Baumann and U.S. Pat. No. 3,715,098, Feb. 6, 1973, to Baumann, present an incoming fluid with a tortuous path to gradually reduce the pressure in stages. An inlet and an outlet are typically separated by a passage that may be open or sealed shut. As the passage opens, the fluid encounters a first restricting structure altering the direction of flow, and then a second restricting structure and so on until the desired pressure drop has occurred. The repeated encounters with restricting structures create a sharply stepped pressure reduction.

While these designs generally function adequately, they are often complex structures requiring relatively expensive fabrication processes. Additionally, there is no simple way to clean the structures short of disassembly. These previous designs keep a fixed number of stages throttling at all times, reducing the capacity of the device. Thus, there is a need for a multistep trim design that allows a smooth pressure reduction, can be flushed without disassembly, is relatively inexpensive to manufacture and has the capability of providing a variation in stages with travel to provide large capacity ranges in a singe device.

SUMMARY OF THE INVENTION

The present invention disclosed herein comprises a method and apparatus for a multistep trim design which substantially eliminates or reduces problems associated with prior flow capacity valves. The present invention allows a gradual alteration in flow capacity of a fluid through a valve by placing a plurality of flow chambers in the path of the incoming fluid.

In accordance with one aspect of the invention, the multistep trim design comprises a housing having an inlet for receiving fluid and an outlet for discharging the fluid. Located between the inlet and the outlet is a stepped plug. A stepped first cage, dimensioned to slidably receive the stepped plug, has axial chambers therein for varying the passage of the fluid between the inlet and the outlet. A second cage with apertures therethrough is located proximate the outlet to discharge fluid into the outlet. An actuator positions the stepped plug at a selected location between a fully closed position and a fully opened position.

In another aspect of the present invention, the housing further includes a seat ring proximate the inlet to mate with the stepped plug when the plug is fully closed to prevent flow through the trim design. The stepped plug is formed from a round bar having a plurality of various outer diameter portions and of varying lengths that telescope into the first cage. The stepped first cage comprises a plurality of concentric cylinders arranged to approximately match the various diameter portions and lengths of the stepped plug. Due to the telescoping arrangement between the stepped plug and the first cage, the trim design may provide a different number of stages the fluid has to pass through by varying the respective positions of the plug and the first stage. By varying the position and size of the axial flow channels in the first stage and the lengths of the steps on the plug, various stage area ratios can be achieved and characterized for different applications. In addition, the trim may be fully opened to allow for maximum capacity and for flushing and cleaning of the various components thereof.

It is a technical advantage of the present invention that it allows a smooth alteration in flow capacity and allows variation in stages and stage ratios with lift. It is a further technical advantage that manufacturing is simplified due to the design of the plug and first chamber. Finally, it is a technical advantage that the trim design may be cleaned without the necessity of disassembly.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 2 is a partially cutaway perspective view of a valve and trim design in accordance with the present invention;

FIG. 3a is a partial, cross-sectional view of the trim design of FIG. 2;

FIG. 3b is a view similar to FIG. 3a but showing the trim design in another operating condition;

FIG. 5a is a top plan view of the concentric cylinders of the first stepped cage;

FIG. 5b is a cross-sectional view of the first stepped cage of FIG. 5a; and

FIG. 6 is a perspective view of a partial section of the internal walls of the concentric cylinders of FIG. 5a.

DETAILED DESCRIPTION OF THE INVENTION

Figure 1:
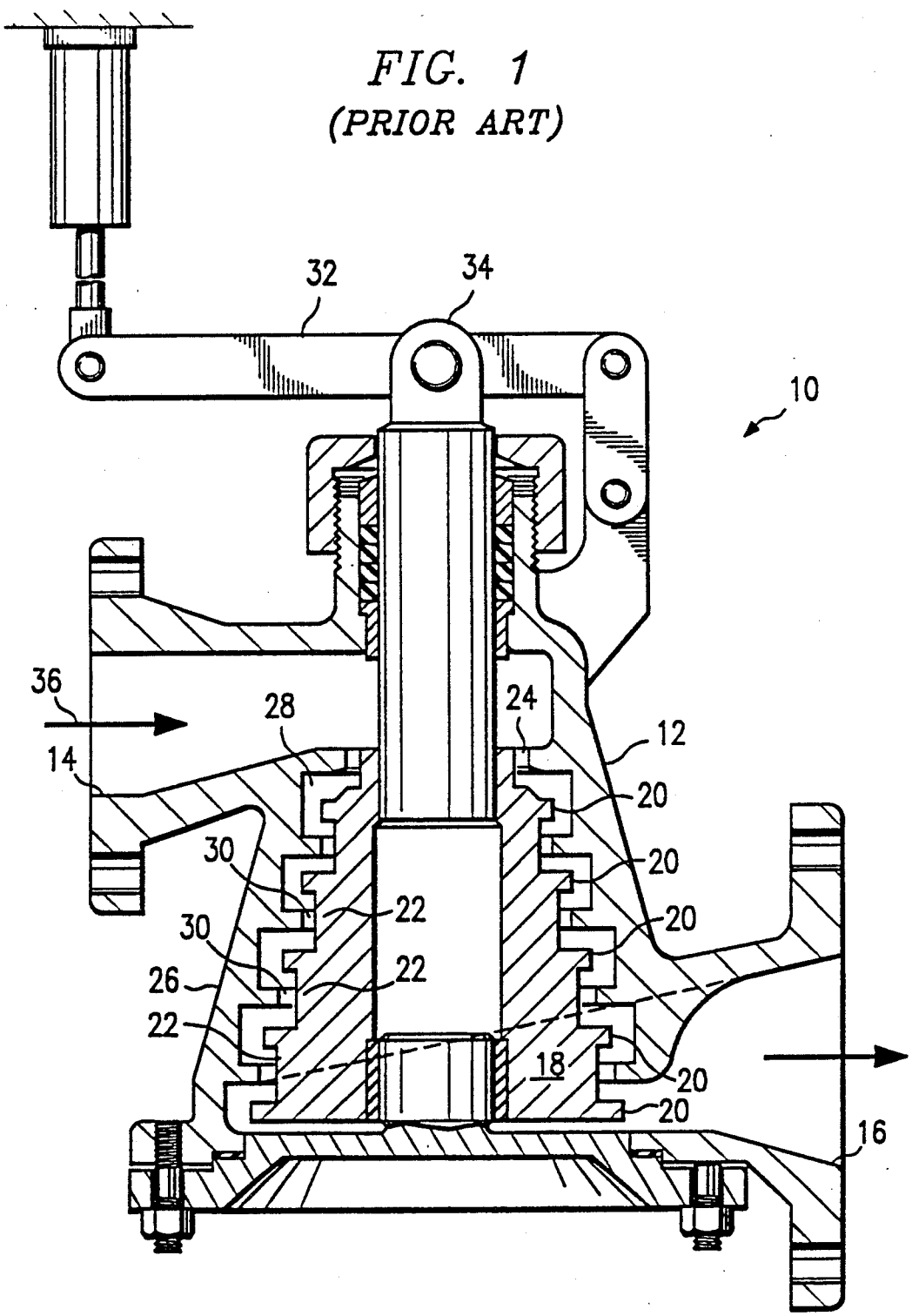
FIG. 1 is a cross-sectional view of an adjustable fluid restricter constructed in accordance with the prior art.

Referring to FIG. 1, a flow restrictive valve in accordance with the prior art is generally identified by the reference numeral 10. The valve 10 comprises a housing 12 having an inlet 14 and an outlet 16. Disposed between inlet 14 and outlet 16 is a flow restricter 18. The flow restricter 18 comprises a series of various diameter washers 20 separated by a series of various diameter spacers 22. The washers 20 have a diameter generally larger than the diameter of the subsequent spacer 22. A seat ring 24 is provided proximate the inlet 14 to allow closure of the valve 10.

The flow restricter 18 is received within a cage 26 having progressively larger diameter spaces 28 opposite the washers 20. Opposite the spacers 22 is a corresponding step 30. An actuator apparatus 32 is secured to a rod 34 extending from the flow restricter 18. Actuator 32 may be engaged to place the flow restricter 18 in a selected position between open (as shown) or closed (not shown).

As the flow restricter 18 is opened, fluid enters through the inlet 14 in the direction shown by arrow 36 into a tortuous path formed by the flow restricter 18 and the cage 26. Due to the tortuous path, the fluid undergoes a stepped pressure reduction until exiting through the outlet 16 in the direction as indicated by arrow 38.

The device, such as valve 10, provides sharply stepped flow restriction with a complex structure that is difficult to manufacture. The number of pressure stages is essentially constant through the valve travel because the restricter 18 will not move to a position wherein the washers 20 can move out of adjacent step 30. The same number of stages are constantly encountered by liquid flowing through the valve thereby restricting the capacity of the device. Additionally, there is no easy method to flush and clean the valve 10 without disassembling the entire device since the washer 20 always remains within the adjacent step 30.

In FIGS. 2-6, like items are identified by like and corresponding numerals for ease of reference. Referring first to FIG. 2, a partially cutaway perspective of a trim design constructed in accordance with the present invention is generally identified by the reference numeral 40. The trim design 40 comprises a housing 42 having a generally cylindrical inner chamber 44 (FIG. 3). An enlarged diameter portion 46 of the chamber 44 is located proximate an outlet 48. An inlet 50 is located in the housing 42 remote from the outlet 48 with a stepped plug 52 positioned therebetween.

The stepped plug 52 has a series of radial and axial surfaces which mate with corresponding radial and axial surfaces on a first cage 56, as will be subsequently described in greater detail. The plug 52 is actuated (moved in the direction of arrow 41) by a stem extension 63 forming a tortuous flow path between the plug 52 and the first cage 56. The valve capacity depends upon the distance that the plug 52 is moved and the machining of the plug 52 and cage 56.

A portion of the trim design 40 of the present invention is illustrated in cross-section in FIGS. 3a and 3b. The enlarged diameter portion 46 of chamber 44 is located in fluid communication with the outlet 48. Disposed between the inlet 50 and outlet 48 is the stepped plug 52 which has an axial length. As illustrated in FIG. 3a, stepped plug 52 is in a fully closed position and is shown in an open position in FIG. 3b.

A seat ring 54 is provided to sealingly engage plug 52 in the closed position to prevent fluid flow through the trim design 40. Adjacent the seat ring 54 is a stepped first cage 56. Appropriate seals 57 are provided to ensure a fluid-tight seal between the seat ring 54 and the first cage 56 and between the seat ring 54 and the housing 42.

Plug 52 has a plurality of various diameter exterior portions forming stepped radial surfaces 58, 60, 62, 64 and 66. Surface 58 has the smallest radius forming a first step and surface 66 has the largest radius forming a last step along the axial length of plug 52. The axial distances on plug 52 between the radial surfaces increase gradually from the shortest length between stepped radial surfaces 58 and 60 to the longest length between stepped radial surfaces 64 and 66. Each stepped radial surface 5866 has a chamfered edge 65.

A stem portion 63 of the plug 52 extends through the housing 42 for connection to an actuating device, not shown. Seal 67 prevents flow past the stem and forms a first balancing chamber 69. The actuating device (not shown) is utilized to move plug 52 from the closed position to the opened position.

Stepped first cage 56 comprises a plurality of concentric cylinders of progressively longer axial length and progressively greater diameter matching the stepped radial surfaces 58-66 of plug 52. The first cage 56 is dimensioned to telescopically receive plug 52 in sliding engagement. The first cage 56 has radial surfaces 68, 70, 72 and 74 to match the radial surfaces 60-66, respectively, and axial surfaces 76 which match axial surfaces 78 of the plug 52. A plurality of axial flow channels indicated generally by the reference character 80 are formed within axial surfaces 76, as will be subsequently described in greater detail. The plug 52 and the first cage 56 may comprise, for example, steel.

A second cage 82 is installed between the outlet 48 and the first cage 56. The second cage 82 has apertures 84 therethrough to allow fluid to enter the enlarged diameter portion 46 and to subsequently exit through the outlet 48. Appropriate seals 86 are provided to prevent leakage of fluid from around the second cage 82. The cage 82 slidingly receives the largest diameter portion of the plug 52.

A retainer 88 is installed adjacent the second cage 82 to position and hold the second cage 82, the first cage 56 and the plug 52 within the cylindrical chamber 44. The retainer 88 has an increased radial portion 90 which provides a stop for the plug 52 when the plug 52 is in the fully opened position. The interior of the retainer 88 has an inner diameter aligned with the interior of the cage 82 for slidingly receiving the plug 52.

Seals 91, 92 and 93 are provided to prevent fluid leakage between the plug 52, the retainer 88 and a bonnet device, shown partially at 94. The bonnet device 94 is provided to enclose the retainer 88, the second cage 82, the first cage 56 and the plug 52 within the housing 42. The seals 91 and 92 form, along with the plug 52 and retainer 88 a secondary balancing chamber 99. The secondary balancing chamber 99 is provided to minimize the hydraulic area offset that occurs when the plug 52 lifts off the seat 54 and exposes the flow passages between the plug 52 and first cage 56 to pressure. The bonnet device 94 has an aperture 95 therethrough to slidably receive the stem 63.

The plug 52 has a first axial passage 96 therethrough from the radial surface 58 to the primary balancing chamber 69 formed between the stem 63 and the bonnet 94. The primary balancing chamber 69 provides a pressure balance between the inlet 50 and the chamber 69 when the trim design 40 is closed. A secondary axial passage 97 extends through the plug 52 having an opening in the axial surface 78 may optionally be provided. The second passage 97 is provided to allow a pressure balance between the inlet 50 and the secondary balancing chamber 99.

Although not shown, it is to be understood that the trim design 40 may be arranged so that the area progression between stages varies to optimize the trim staging for various fluids and services.

Referring simultaneously to FIGS. 5a and 5b, the stepped first cage 56 is illustrated in various stages of fabrication in accordance with the present invention. Referring to the plan view of FIG. 5a, cage 56 begins as a solid round bar. To form the flow channels 80, a plurality of holes 100 are drilled axially in a pre-planned pattern into the top surface 74 of the cage 56. The holes 100 are drilled with various diameters and various axial lengths into the cage 56 to allow for a progressively increased flow as the stepped plug 52 is opened. Although not shown, it is understood that holes 100 can be any appropriate shape such as tapered or conical. The holes 100 are drilled to coincide with the axial surfaces 76 of the cage 56. Once the holes 100 have been drilled, the cage 56 is machined to form the concentric cylinder shape to match the plug 52. As the cage 56 is machined to form the axial surfaces 76 and the radial surfaces 68-74, a portion of the holes 100 remains in the axial surfaces 76 to form the axial flow channels.

Figure 6:
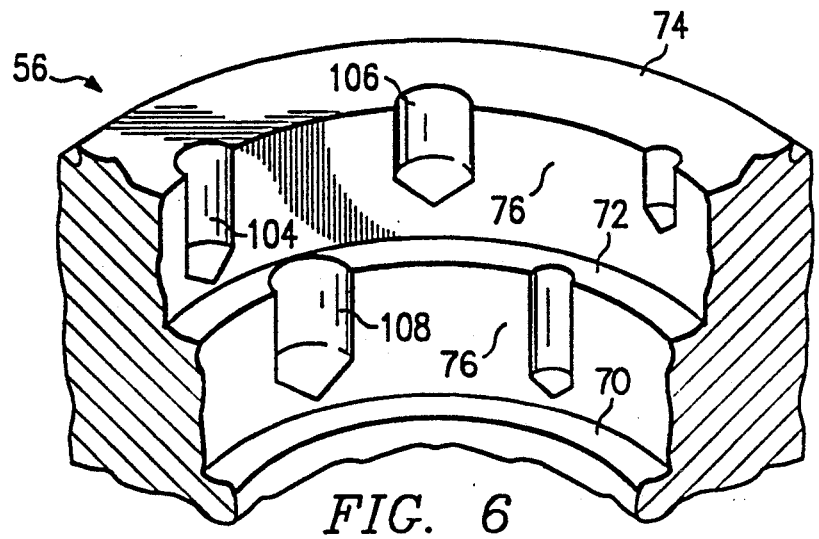

Referring to FIG. 6, a perspective view of a portion of a typical cage 56 is illustrated. Axial channels 104, 106 and 108 remain in radial surfaces 72 and 74 and axial surfaces 76 after boring of the cage 56 which boring operation intersects the drilled holes to form the channels. Thus, as can be appreciated, when the radial surfaces 58-66 of the plug 52 move past the axial surfaces 76, axial channels 104, 106 and 108 are opened to allow fluid to flow to the next radial channel thereabove. Therefore, by designing the location, size and number of the axial channels, the capacity and staging ratios through the trim design 40 may be adjusted as desired.

An additional benefit of the trim design 40 is the easy flushing and cleaning capability. By moving the plug 52 to its uppermost position, the trim design 40 may be injected with a cleaning solution to remove any solids or residues without the necessity of disassembly due to the large space between the plug 52 and cage 56.

In operation, fluid enters the inlet 50 as indicated by arrow 110. When the plug 52 is in the closed position with the plug engaging the seat ring 54, the fluid is not allowed to pass. As the plug 52 is moved to desired positions between the closed and fully opened position, fluid enters the trim design 40. The fluid will progressively encounter radial surfaces 58-66 and enter axial flow channels 80. The fluid flows through the axial flow channels 80 into radial channels formed between the radial surfaces 60-66 and the radial surfaces 68-74 at each level. The radial surfaces 58-66 in conjunction with the axial flow channels 80 provide a tortuous path for fluid flow.

As the plug 52 is moved towards its fully opened position, the fluid will progressively encounter different axial flow channels 80 within the first cage 56. The initial steps on the plug 52 will disengage first from the lowermost surface 76 on the first cage 56, decreasing the number of flow channels in series and providing an increase in flow capacity. Farther upward movement of the plug 52 disengages additional surfaces 76 on the cage 56 from the plug 52. It will be noticed that the flow space between the plug 52 and the first cage 56 increases thereby increasing the flow volume and decreasing the resistance to flow. The chamfered edges 65 allow a gradual flow transition as steps on the plug are disengaged rather than sharp flow transitions as would be encountered with a squared edge. The result is an evenly adjustable flow capacity through the trim design 40 as illustrated by the curve of FIG. 4.

Once the flow reaches the second cage 82, the fluid passes through the apertures 84 into the enlarged diameter portion 46 and out through the exit 48 as indicated by arrow 112. Thus the stepped plug 52 and the stepped first cage 56 form an improved pressure reducer in a flow restrictive valve.

Figure 4:
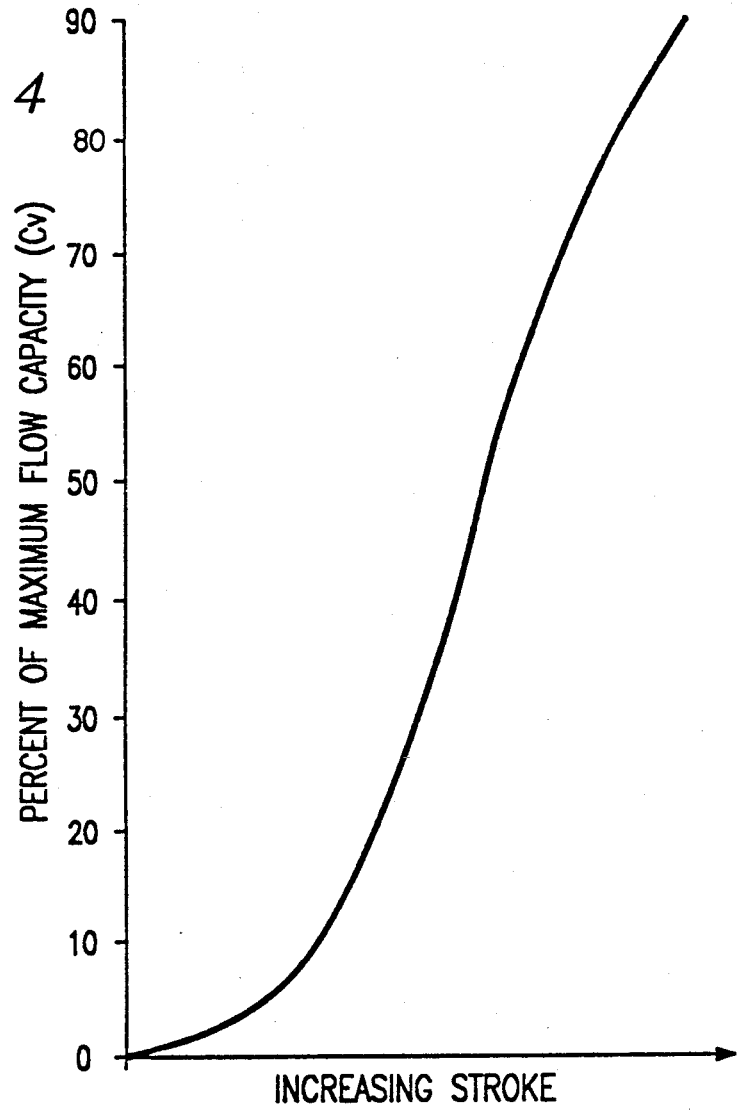
FIG. 4 is a graphic representation of flow capacity versus stroke.

Referring to FIG. 4, a graphical representation of Percent of Maximum Flow Capacity ($C_v$) versus Increasing Stroke is illustrated. The graph shows that as the stroke increases (stepped plug 52 is opened farther and farther) there is a gradual and smooth increase in flow capacity. The smooth shape of the curve is attributable to the axial channels 80 and the chamfered edges 65 in conjunction with the stepped plug 52. The number of steps engaged by fluid flowing through the trim design 40 decreases with plug lift.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. An improved stepped flow capacity apparatus in a valve of the type having an inlet for receiving fluid and an outlet for discharging fluid, comprising:
    a stepped plug having an axial length disposed between the inlet and the outlet; and
    a stepped cage dimensioned to telescopically receive said stepped plug, said stepped cage having radial and axial surfaces, said axial surfaces having discrete axial channels formed therein for allowing the passage of the fluid between said cage and said stepped plug from one said radial surface to another said radial surface to adjust flow capacity of the fluid by passing the fluid along a stepped and channeled path from the inlet to the outlet.

2. The apparatus of claim 1, wherein said stepped plug comprises a round bar having a plurality of progressively larger diameter portions along said axial length.

3. The apparatus of claim 2, wherein said larger diameter portions have chamfered edges.

4. The apparatus of claim 2, wherein said stepped cage comprises a plurality of progressively smaller diameter cylinders to approximately match and slidably receive said stepped plug.

5. The apparatus of claim 1, further comprising means for gradually moving said plug from a fully closed position to a fully opened position.

6. A multistep trim design, comprising:
    a housing having an inlet for receiving fluid and an outlet for discharging said fluid;
    a stepped plug having an axial length disposed between said inlet and said outlet;
    a stepped first cage dimensioned to slidably receive said stepped plug, said first cage having axial channels for allowing the passage of said fluid between said first cage and said stepped plug;
    a second cage between said outlet and said first cage, said second cage having apertures therethrough to radially discharge said fluid into said outlet and dimensioned to slidably pass said stepped plug; and
    actuating means for gradually positioning said plug from a closed position, in which no fluid flows from said inlet to said outlet, to a fully opened position, wherein as said plug is opened, the fluid passes through a stepped path aided by said axial channels to said outlet.

7. The trim design of claim 6, wherein said housing further comprises a seat ring proximate said inlet for sealingly engaging said stepped plug when said trim design is in said closed position.

8. The trim design of claim 6, wherein said stepped plug further comprises a plurality of progressively larger diameter portions that telescope into said first cage.

9. The trim design of claim 8, wherein said progressively larger diameter portions include a chamfered edge.

10. The trim design of claim 6, wherein said stepped first cage further comprises a plurality of concentric cylinders of varying diameters arranged to approximately match said stepped plug.

11. The trim design of claim 6, further comprising:
a primary balancing chamber; and
means for communicating between the inlet and said chamber to balance a first pressure when said plug is in said closed position.

12. The trim design of claim 11, further comprising:
a secondary balancing chamber; and
means for communicating between said secondary chamber and a designated location between said secondary chamber and said inlet to balance a second pressure when said stepped plug is positioned between said closed position and said fully opened position.

13. The trim design of claim 6, wherein said axial channels in said first cage comprise approximately semicircular holes of various diameters and axial lengths.

14. The trim design of claim 6, wherein said axial channel in said first cage comprises tapered holes of various axial lengths.

15. The apparatus of claim 6 and further including:
progressively larger diameter portions located axially along said plug;
progressively longer axial length separates each said larger diameter portion on said plug; and
progressively smaller diameters on said cage spaced by progressively longer axial lengths to approximately match said stepped plug, whereby axial movement of said plug from said closed position toward said opened position increases the distance between said plug and cage and decreases the steps that fluid flowing from said inlet to said outlet encounters.

16. An improved method for manufacturing a multi-step trim design to fit into a housing having an inlet for receiving fluid and an outlet for discharging the fluid, comprising the steps of:
forming a stepped plug having an axial length to fit between the inlet and the outlet;
forming a stepped first cage to slidably receive said stepped plug;
forming axial channels in said first cage for allowing passage of the fluid between said first cage and said stepped plug; and
forming an apertured second cage between said outlet and said first cage to pass said fluid through said apertures to said outlet.

17. The method of claim 16, wherein the step of forming a stepped plug comprises forming a round bar into plurality of progressively larger diameter portions along said axial length.

18. The method of claim 17, wherein the step of forming further comprises forming said round bar into progressively longer axial length between said progressively larger diameter portions.

19. The method of claim 17, further comprising step of forming chamfered edges on each of said progressively larger diameter portions.

20. The method of claim 16, wherein the step of forming a first cage comprises forming a plurality of concentric cylinders to approximately match said stepped plug.

21. The method of claim 20, wherein the step of forming axial channels comprises:
drilling circular holes of various lengths and diameters into said cage; and
boring varying diameter bores into said cage of a size to correspond to the varying diameters on said plug.

22. A method for varying flow capacity in a valve of the type having an inlet for receiving fluid and an outlet for discharging fluid, comprising the steps of:
disposing a stepped plug between the inlet and the outlet within a first cage, said first cage having axial channels therein for passing the fluid between said first cage and said stepped plug;
positioning a second cage between the outlet and said first cage to radially discharge the fluid through apertures therein to the outlet; and
adjustably positioning said plug between a closed position, in which no fluid flows from the inlet to the outlet, and a fully opened position, said positioning providing a tortuous stepped and channeled path for the fluid such that the flow capacity is varied.

23. The method of claim 22, wherein the step of disposing a stepped plug further comprises forming said plug with a plurality of progressively larger diameter portions along an axial length thereof.

24. The method of claim 23, wherein the step of forming further comprises forming said portions with chamfered edges.

25. The method of claim 22, wherein the step of adjustably positioning further comprises forming said axial channels with various radii and various axial lengths such that as said plug is opened progressively more of said channels are open to the fluid.

26. The method of claim 22, wherein the initial steps on the plug and first cage disengage with valve travel, resulting in a less tortuous flow passage and increased valve flow capacity.

27. An improved stepped flow capacity apparatus in a valve of the type having an inlet for receiving fluid and an outlet for discharging fluid, comprising:
a stepped plug having an axial length disposed between the inlet and the outlet;
a stepped cage dimensioned to telescopically receive said stepped plug and having discrete axial channels therein for allowing the passage of said fluid between said cage and said stepped plug to adjust flow capacity of the fluid by passing the fluid along a stepped and channeled path from the inlet to the outlet;
means for gradually moving said plug from a fully closed position to a fully opened position;
progressively larger diameter portions located axially along said plug;
progressively longer axial length separates each said larger diameter portion on said plug;
progressively smaller diameters on said cage spaced by progressively longer axial lengths to approximately match said stepped plug, whereby axial movement of said plug from said closed position toward said opened position increases the distance between said plug and cage and decreases the steps that fluid flowing from said inlet to said outlet encounters; and
a balancing passageway extending axially through said plug for permitting balancing of pressure forces on said plug.

28. An improved stepped flow capacity apparatus in a valve of the type having an inlet for receiving fluid and an outlet for discharging fluid, comprising:
- a stepped plug having an axial length disposed between the inlet and the outlet, said stepped plug comprising a round bar having a plurality of progressively larger diameter portions along said axial length with a progressively longer axial length separating each said larger diameter portion; and
- a stepped cage dimensioned to telescopically receive said stepped plug, said stepped cage having discrete axial channels formed therein for allowing the passage of the fluid between said cage and said stepped plug to adjust flow capacity of the fluid by passing the fluid along a stepped and channeled path from the inlet to the outlet.

29. An improved stepped flow capacity apparatus in a valve of the type having an inlet for receiving fluid and an outlet for discharging fluid, comprising:
- a stepped plug having an axial length disposed between the inlet and the outlet;
- a stepped cage dimensioned to telescopically receive said stepped plug, said stepped cage having discrete axial channels formed therein for allowing the passage of said fluid between said cage and said stepped plug to adjust flow capacity of the fluid by passing the fluid along a stepped and channeled path from the inlet to the outlet;
- means for gradually moving said plug from a fully closed position to a fully opened position;
- progressively larger diameter portions located axially along said plug;
- progressively longer axial length separates each said larger diameter portion on said plug; and
- progressively smaller diameters on said cage spaced by progressively longer axial lengths to approximately match said stepped plug, whereby axial movement of said plug from said closed position toward said opened position increases the distance between said plug and cage and decreases the steps that fluid flowing from said inlet to said outlet encounters.

* * * * *